Patented June 12, 1934

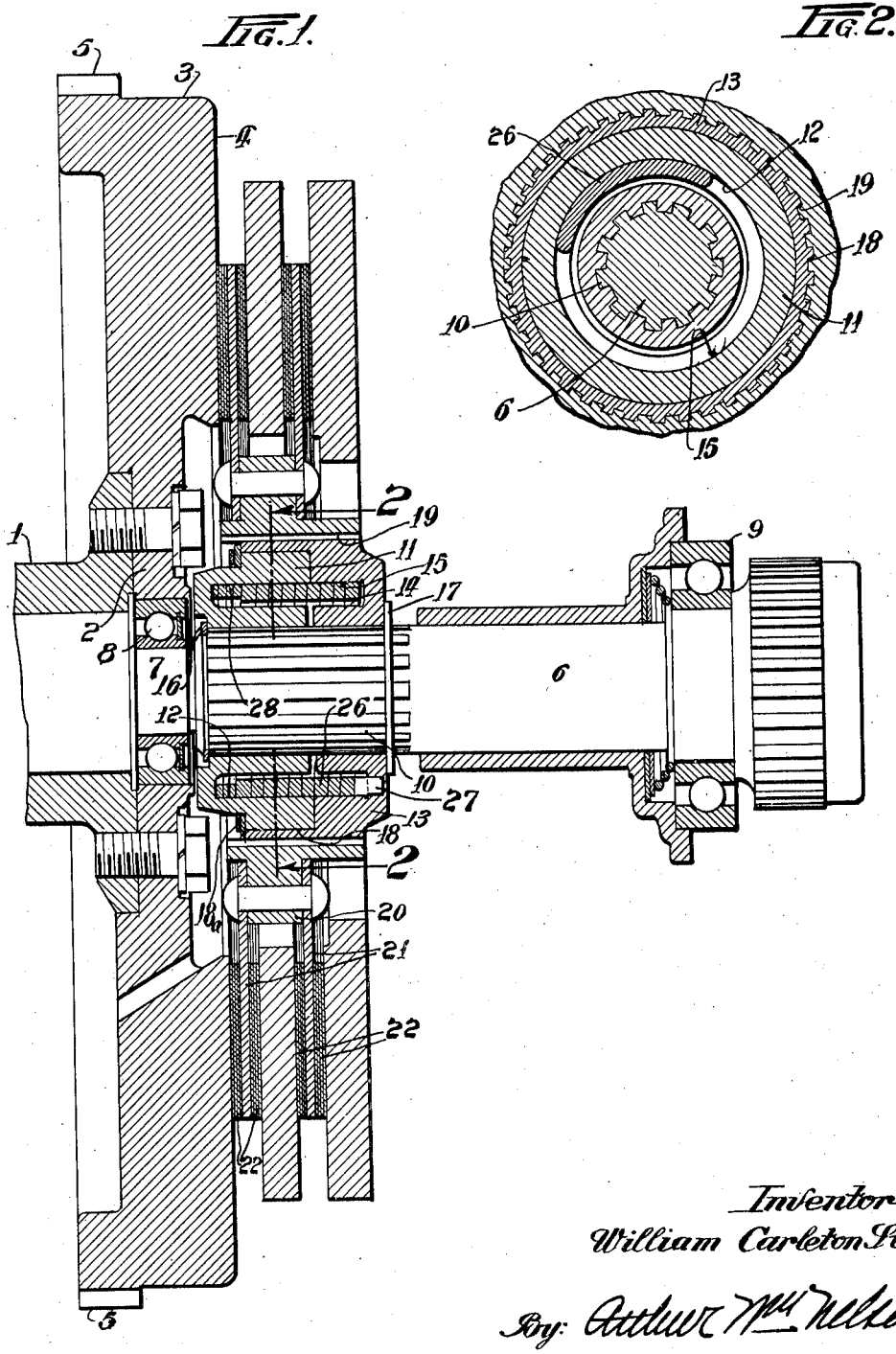

1,962,219

UNITED STATES PATENT OFFICE 1,962,219

AUTOMOTIVE CLUTCH

William Carleton Starkey, Indianapolis, Ind., assignor to L. G. S. Devices Corporation, Indianapolis, Ind., a corporation of Indiana Application May 14, 1931, Serial No. 537,318

2 Claims. (Cl. 192—48)

This invention relates to improvements in automotive clutches and it consists of the matters hereinafter described and more particularly pointed out in the appended claims.

The primary object of the invention is to provide a clutch which is especially adapted for use in an automotive vehicle for transmitting power from the engine to the drive shaft of the transmission and includes means permitting of an overrunning of said shaft with respect to said engine when said shaft tends to rotate faster than engine speed.

A further object of the invention is to provide an automotive clutch which has an overrunning clutch in its hub, is of a simple construction, is positive in its action and in no manner disturbs the balance of the clutch so as to induce vibration therein.

These objects of the invention as well as others, together with the many advantages thereof, will more fully appear from a consideration of the following detailed description.

In the drawing:—

Fig. 1 is a longitudinal vertical section through an automotive clutch embodying the invention.

Fig. 2 is a transverse vertical section taken on the line 2—2 of Fig. 1.

The clutch which forms the subject matter of the present invention is primarily intended for transmitting power from the engine of an automotive vehicle to the drive shaft of the transmission and includes the usual discs or plates which are adapted so to engage the fly wheel for the engine as to be driven thereby. As in conventional clutches of this kind, the engagement for driving action between said discs and the fly wheel is controlled by the usual foot pedal. On that end of the drive shaft of the transmission that is associated with the clutch discs is a secondary or overrunning clutch. Said overrunning clutch in this instance includes a member which is loose on the drive shaft of the transmission and a member which is splined to the drive shaft, the clutch disc carrying plate being splined to the first member for a limited longitudinal movement. The two members of the overrunning clutch coact to provide a recess or pocket surrounding a part of said shaft. In said pocket is a helical clutch spring which in response to relative rotation of said members in one direction, expands and thus operates to clutch the members together. In response to relative rotation of the members in the other direction, the spring is adapted to contract and thus to declutch said members and permit an overrunning action therebetween.

Referring now in detail to the automotive clutch that is illustrated in the drawing:— 1 indicates the flanged end of an engine crank shaft to which is bolted in the usual manner the hub portion 2 of a fly or balance wheel 3. On the periphery of the fly wheel, are teeth 5 which are adapted to be engaged by the pinion of a starting motor (not shown).

6 indicates the drive shaft of the transmission of the vehicle with which the clutch is associated. This shaft has an end part 7 of reduced diameter journalled in an antifriction bearing 8 in the fly wheel hub 2. The opposite end of said shaft is journalled in another antifriction bearing 9 in the front wall of the transmission housing. Near said end part 7, the shaft 6 is splined as at 10.

Disposed on and connected to rotate with, said splined part 10 of the shaft 6 is an overrunning clutch member 11 having an annular groove 12 therein, facing away from said fly wheel. Loosely mounted on said splined part of the shaft 6 is a second overrunning clutch member 13 also having an annular groove 14 therein which faces toward the first mentioned groove and coacts therewith to provide a clutch spring pocket 15. The two clutch members are held respectively against endwise displacement upon said splined part 10 of the shaft 6 by locking rings 16 and 17. The clutch member 13 is annularly rabbetted as at 18 so as to receive and embrace the associated end portion of the clutch member 11 and a split spring locking ring 18$^a$ is employed to secure said members against endwise separation.

The periphery of the clutch member 13 is longitudinally splined as at 19 and mounted thereon so as to rotate therewith but to be capable of limited longitudinal movement thereon is a hub 20 to which plates 21 carrying the discs 22 of the main power transmitting clutch is secured in any suitable manner. Said clutch which is only conventionally shown herein, is normally engaged with the fly wheel through the usual spring and may be disengaged therefrom by means of the usual clutch pedal in the manner well known.

In the pocket 15 as provided by the coacting annular grooves in the clutch members 11 and 13 is disposed a helical main clutch spring 26 and one end of said spring is formed with an axially disposed toe 27 which is anchored in the associated end of the clutch member 13 so that the spring is connected to the clutch member 13 for rotation therewith. The other end of said main clutch spring has operatively connected thereto a helical secondary or energizing spring 28 of a normally slightly larger diameter than the main spring 26 and made of smaller cross sectional stock. Such an energizing spring being more sensitive in its action than the main clutch spring, operates in response to relative rotation of the clutch members in the proper direction to expand the main clutch spring and insures the action of every turn in the main spring in clutching the two clutch members together. Thus the main clutch spring can normally have a slight clearance with respect to the clutch members 11 and 13 whereby the only drag in the overrunning of said members is the light and almost undetected drag of the energizing spring.

In the operation of the construction before described, when the member 20 is driven by the fly wheel, it is apparent that through the spline connection 19, the clutch member 13 is likewise driven. As the main clutch spring 26 is anchored at one end to the clutch member 13, said spring tends to turn therewith and will first act to unwind the energizing spring so that it will clutch against the member 11. This will hold the associated end of the main clutch spring which will progressively expand from that end, to engage the annular face of the clutch spring pocket and clutch the two members together.

When the shaft 6 tends to rotate faster than the engine as when descending a grade or as when the accelerator of the vehicle is released, the clutch member 11 because of its splined connection with the shaft 6, will rotate with it and relatively to the clutch member 13. This will act to cause a winding up of first the energizing spring and then the main clutch spring which contracts radially and releases its clutching action so that the shaft 6 can overrun the fly wheel, it being assumed that the main power transmitting clutch is still operatively engaged with the fly wheel.

Thus I have provided, within the main or power transmitting clutch and between it and the drive shaft of the transmission, a secondary and smaller clutch which permits of the overrunning of the shaft 6 of the transmission with respect to the fly wheel under conditions above noted. The overrunning clutch is of such a construction and is so positioned with respect to the main clutch as to be perfectly balanced as it includes no centrifugally acting weights or the like which might set up an off balance that would induce vibration. The parts are few in number, are small and compact and do not increase the axial length of the main clutch as a whole.

Again, by arranging the overrunning clutch as described, free wheeling is possible in all speed ratios of the transmission.

While in describing the invention, I have referred in detail to the form, arrangement and construction of the parts thereof, the same is to be considered merely as illustrative so that I do not wish to be limited thereto except as may be specifically set forth in the appended claims.

I claim as my invention:—

1. In combination with an engine fly wheel, and a shaft to be driven thereby, a clutch member fixed with respect to the shaft, a second clutch member loose on said shaft and including an externally splined part embracing the first mentioned clutch member, means on said shaft preventing relative longitudinal movement but permitting relative rotative movement between said clutch members, said clutch members having oppositely facing, annular recesses therein coacting to form a clutch spring pocket, a clutch spring in said pocket and operable upon relative rotation of said clutch members in one direction to clutch said members together, and a power transmitting clutch including a member so mounted upon said externally splined part of said second clutch member that said power transmitting clutch is movable thereon into and out of operative engagement with said fly wheel.

2. In combination with an engine fly wheel and a shaft to be driven thereby, a pair of complemental clutch members positioned one opposite the other and shaped to form an annular pocket therebetween, one of said members being fixed on the shaft and the other being loosely mounted on said shaft, a helical clutch spring in said pocket having one end thereof connected to said other clutch member so that it is rotatable therewith, and arranged so that in response to relative rotation of said clutch members in one direction, it operates to change its diameter and clutch said two clutch members together, and a power transmitting clutch movable into and out of operative engagement with the fly wheel and having a central portion rotative with said other clutch member but capable of a limited longitudinal movement thereon.

WILLIAM CARLETON STARKEY.